Sept. 17, 1957
E. REZABEK
2,806,337
FIELD HAY DRIER
Filed Sept. 28, 1956
4 Sheets-Sheet 1
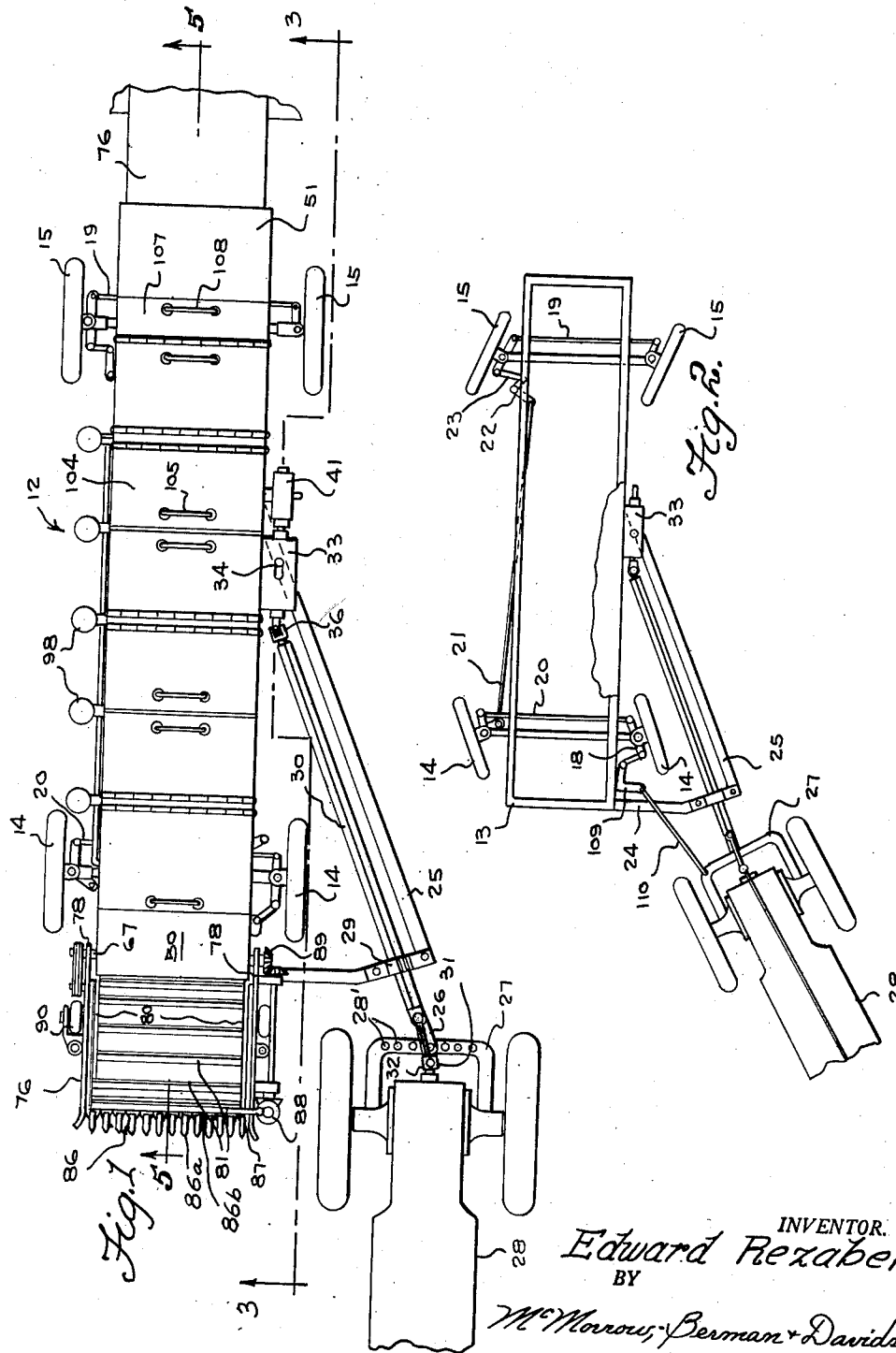
INVENTOR.
Edward Rezabek
BY
McMorrow, Berman & Davidson
ATTORNEYS

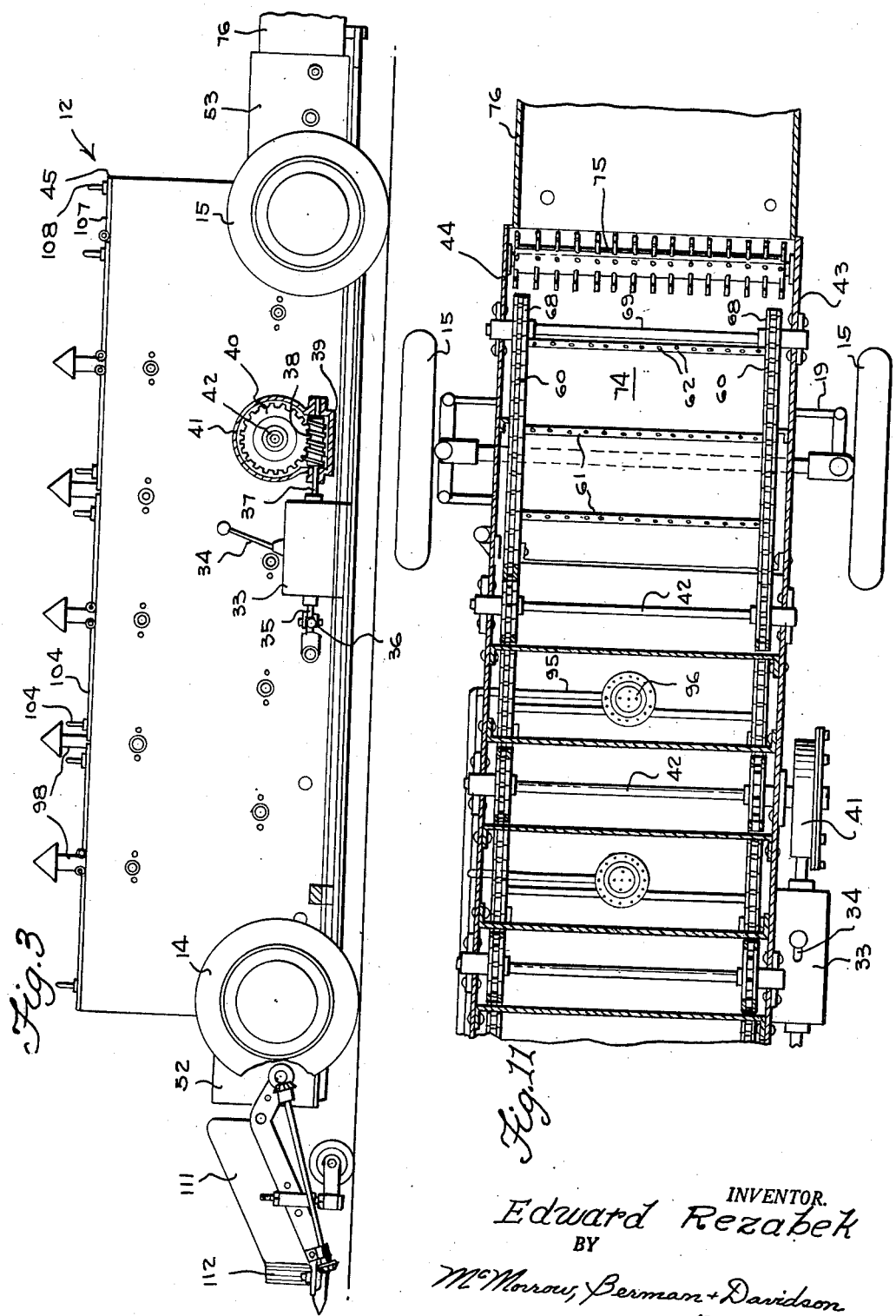

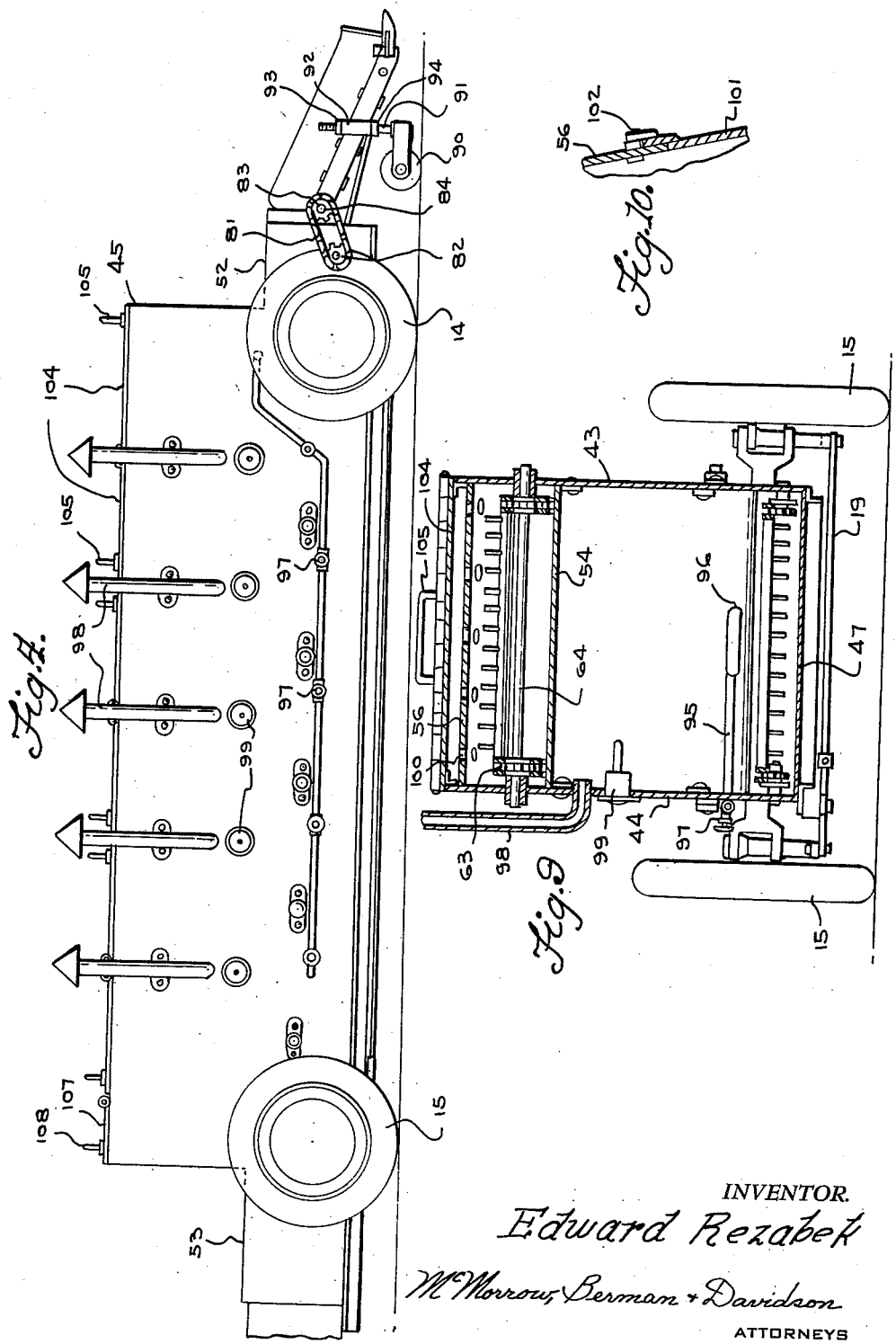

Sept. 17, 1957
E. REZABEK
2,806,337
FIELD HAY DRIER
Filed Sept. 28, 1956
4 Sheets-Sheet 4
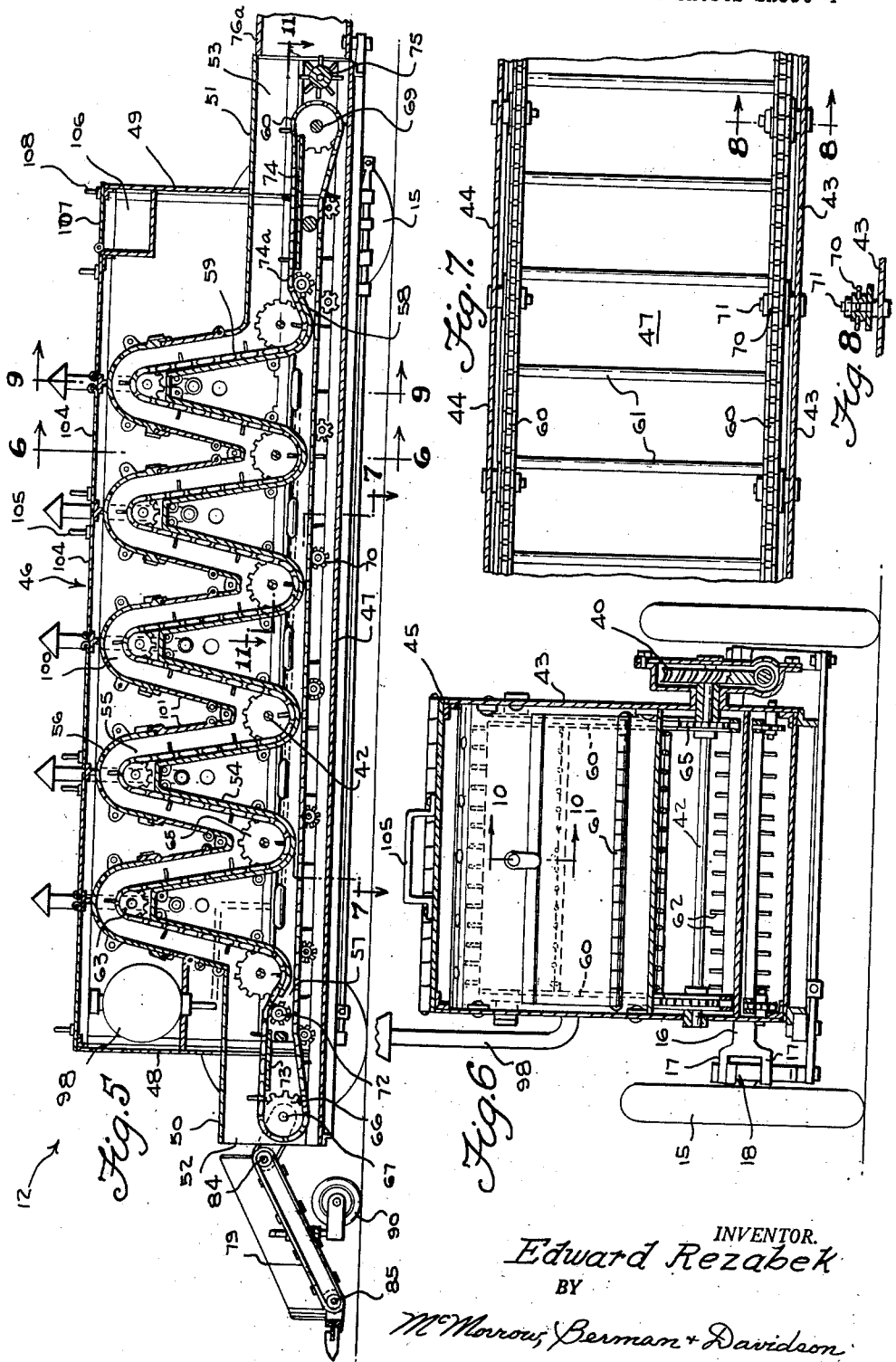
INVENTOR.
Edward Rezabek
BY
McMorrow, Berman + Davidson
ATTORNEYS

United States Patent Office 2,806,337
Patented Sept. 17, 1957

2,806,337

FIELD HAY DRIER

Edward Rezabek, Traverse City, Mich.

Application September 28, 1956, Serial No. 612,714

3 Claims. (Cl. 56—1)

This invention relates to harvesting machines, and more particularly to a machine for harvesting and drying hay and for preparing said hay for delivery to a baler.

A main object of the invention is to provide a novel and improved machine adapted to be drawn by and driven by a conventional farm tractor, said machine being formed and arranged for harvesting and drying hay and for delivering the hay to a conventional baler.

A further object of the invention is to provide an improved hay harvesting and drying attachment for a farm tractor, said attachment being relatively simple in construction, being easy to maintain in working order, and being arranged so that it can be easily transported by the tractor employed therewith and can be easily steered over its intended course of travel.

A still further object of the invention is to provide an improved hay harvesting and drying attachment for a farm tractor, said attachment involving relatively inexpensive components, being rugged in construction, being provided with heaters for drying the hay and with a self-contained fuel supply for said heaters, being convenient for access to the interior parts thereof, and being easy to maneuver.

Further objects and advantages of the invention will become apparent from the following description and claims, and from the accompanying drawings, wherein:

Figure 1 is a top view of an improved hay harvesting machine constructed in accordance with the present invention, and shown attached to the rear portion of a conventional farm tractor.

Figure 2 is a fragmentary top plan view, similar to Figure 1, but to a reduced scale, showing the manner in which the hay harvesting machine is steered by the tractor associated therewith to make a sharp turn.

Figure 3 is a side elevational view, with parts broken away and in section, taken on the line 3—3 of Figure 1.

Figure 4 is a side elevational view of the hay harvesting machine of Figure 3 taken from the opposite side thereof.

Figure 5 is a longitudinal cross sectional view of the hay harvester taken on the line 5—5 of Figure 1.

Figure 6 is an enlarged transverse vertical cross sectional view taken on the line 6—6 of Figure 5.

Figure 7 is a fragmentary horizontal cross sectional view taken on the line 7—7 of Figure 5.

Figure 8 is an enlarged cross sectional detail view taken on the line 8—8 of Figure 7.

Figure 9 is an enlarged transverse vertical cross sectional view taken on the line 9—9 of Figure 5.

Figure 10 is an enlarged cross sectional detail view taken on the line 10—10 of Figure 6.

Figure 11 is an enlarged fragmentary horizontal cross sectional view taken on the line 11—11 of Figure 5.

Referring to the drawings, 12 generally designates an improved hay harvesting and drying machine according to the present invention, said machine comprising a main frame 13 of generally rectangular shape, as shown in Figure 2, said main frame being supported on a pair of front wheels 14, 14 and a pair of rear wheels 15, 15 which are steerably journaled, in any suitable manner, to the frame 13. Thus, as shown in Figure 6, the wheels may be steerably journaled to the end portions of axle bars 16 formed with top and bottom horizontal lugs 17, 17 in which are rotatably mounted respective bearings for rotatably receiving the axles of the wheels, the bearings being mounted in steering knuckles 18. The steering knuckles of the respective pairs of wheels 15, 15 and 14, 14 are linked together by transverse drag link bars 19 and 20, as shown in Figure 2. The steering knuckles at one side of the frame 13 are further connected by a longitudinal link rod 21, a short link 22 and a bell crank 23, pivoted to one side of frame 13, whereby turning of the front wheels 14, 14 in one direction causes the rear wheels 15, 15 to be turned in the opposite direction, as is clearly illustrated in Figure 2.

Rigidly secured to the frame 13 is an outwardly extending arm 24, located at the forward end of frame 13, said arm being rigidly connected to a forwardly and outwardly inclined bar 25, defining a laterally projecting subframe at one side of the main frame 13. Secured to the outer portion of the subframe defined by the members 24 and 25 is a forwardly and laterally inclined hitch tongue 26 adapted to be pivotally connected to a hitch bar 27 secured to the rear end of a conventional farm tractor 28 at a selected hitch aperture 28 in the hitch bar 27, as shown in Figure 1. The tongue 26 is apertured so that it may be connected to the hitch bar 27 at a selected aperture 28' thereof by means of a suitable hitch bolt.

Journaled on the arm 24 by a suitable bearing 29 is a transmission shaft 30 provided at its forward end with a universal joint 31 and suitable fastening means for coupling same to the power takeoff shaft 32 of the tractor 28. Mounted on the frame 13 is a transmission unit 33 of conventional design provided with a speed selecting lever 34. The input shaft 35 is connected to the rear end of the transmission shaft 30 through a universal joint 36, as shown in Figure 3. The transmission unit 33 has an output shaft 37 provided with a worm 38 suitably journaled in a bearing member 39 mounted on the frame 13 and meshing with a worm gear 40 mounted in a gear housing 41 unitary with the bearing member 39. The worm gear 40 is mounted on the end of a transverse shaft 42 extending through and journaled in the side walls 43 and 44 of a generally rectangular main closed housing 45 secured on the frame 13.

Main housing 45 has a bottom wall 47 and a top wall 46 as well as a front wall 48 and a rear wall 49. As shown in Figure 5, the bottom wall 47 projects forwardly and rearwardly beyond the front wall 48 and the rear wall 49 at the opposite ends of the housing 45, the side walls 43 and 44 similarly projecting forwardly and rearwardly of the front wall 48 and rear wall 49 at the lower portions of the main housing and are connected at their top edges by respective horizontal plate members 50 and 51, as shown in Figure 5, defining longitudinal inlet and outlet conduits 52 and 53 projecting outwardly from the front and rear walls 48 and 49 of the housing 45.

A plurality of cooperating top and bottom walls 56 and 54 respectively, of inverted V-shape arranged in tandem relation are fixedly positioned within the housing 45 between the front and rear walls 48 and 49 of the latter named housing and are secured to the side walls 43 and 44 so as to be rigid with the housing, the cooperating top and bottom walls 56 and 54 together forming a continuous open ended tunnel 55 of inverted V-shaped bends, as shown in Figure 5. The top wall 56 of the tunnel 55 is generally similar in configuration to the bottom wall 54 and is vertically spaced above said bottom wall, as shown in Figure 5, said top wall being connected at its forward and rear edges to the transverse edges of the respective conduit top wall members 50 and 51 so as to merge therewith. The bottom wall 54 is provided with the forwardly and upwardly inclined end portion 57 at its forward end extending into the inlet conduit 52, and is provided at its rear end with the upwardly and rearwardly inclined marginal portion 58 extending into the outlet conduit 53, as is clearly shown in Figure 5. It is to be noted that the inlet conduit 52 projects outwardly of the front wall 48 of the housing 45 and the outlet conduit 53 projects outwardly of the rear wall 49 of the housing 45.

Conveying means indicated by the numeral 59 is confined in the inlet and outlet conduits 52 and 53 and the tunnel 55 and is operatively mounted for progressively conveying incoming cut hay entering the inlet conduit 52 through the latter conduit, the tunnel 55, the outlet conduit 53 and out of the exit end of the outlet conduit 53. Such conveying means comprises a pair of endless side chains 60, 60 connected by spaced transverse bars 61, as shown in Figure 6. The transverse bars 61 are spaced closely enough to support cut hay therebetween and are provided with evenly spaced prongs 62 which project upwardly at the top portion of the endless belt conveyor 59 and which project downwardly at the bottom portion of said belt conveyor, as is shown in Figure 5. The chains 60 are supported on sprocket wheels 63 at the upper portions of the inverted V-shaped sections, said sprocket wheels being mounted on transverse shafts 64 journaled in the opposite side walls 43 and 44 of main housing 45, as shown in Figure 9, the sprockets 63 being located adjacent said side walls and immediately above the bottom transverse wall member 54 of the drying tunnel 55. At the lower portions of the drying tunnel the conveyor chains are engaged around lower sprocket wheels 65 mounted on additional transverse shafts 42 journaled in the side walls 43 and 44 of main housing 45. As shown in Figure 6, one of the shafts 42 carries the worm gear 40, whereby the belt conveyor 59 is driven from the power takeoff shaft of the tractor employed with the machine.

The chains 60, 60 of the belt conveyor engage around sprocket wheels 66, 66 mounted on a transverse shaft 67 journaled in the side walls of the forward portion of intake conduit 52 and are engaged around similar sprocket wheels 68 mounted on a transverse shaft 69 journaled in the side walls of the discharge conduit 53 at the intermediate portion thereof, as shown in Figure 5. The lower portions of the conveyor chains 60, 60 are supported on idler spockets 70 journaled on suitable transversely extending shafts 71 secured to the respective side walls 43 and 44 of the main housing 45, as shown in Figure 8, said sprockets 70 being spaced approximately in the same manner as are the successive bends of the drying tunnel 55, as shown in Figure 5, so as to support the conveyor chains against excessive sagging.

As shown in Figure 5, guide sprockets 72 are provided for the conveyor chains between the forward end 57 of the bottom wall 54 of the drying chamber and a horizontal receiving plate 73 provided in the intermediate portion of the intake conduit 52. The transverse cross bars 61 of the belt conveyor slidably engage on the horizontal supporting plate 73 and also substantially slidably engage on the lower wall of the drying tunnel 55, being guided from the plate 73 to the marginal portion 57 of said lower wall by the sprockets 72. Similarly, the sprockets 74a are provided between the rear margin 58 of lower wall 54 and a horizontal plate 74 provided in the intermediate portion of the discharge conduit 53, as shown in Figure 5, serving to support the transverse cross bars 61 as they move toward the rear end of discharge conduit 53. As shown, the sprockets 66 are located adjacent the forward edge of the front receiving plate 73 and the sprockets 68 are located adjacent the rear edge of the exit supporting plate 74.

A suitable feed roller 75, for example a toothed roller, is journaled transversely between the side walls of exit conduit 53 adjacent to the rear sprockets 68, as shown in Figure 5, to guide the dried hay from the belt conveyor 59 into the intake conduit 76a of a conventional baler which may be connected to the rear conduit 53 in any suitable manner.

Designated generally at 76 is a sub-frame which is hingedly connected to the forward end of the inlet conduit 52, as by the longitudinal frame bars 78, 78 of sub-frame 76 which are pivotally engaged with the transverse shaft 67, as shown in Figure 1. Mounted on the sub-frame 76 is an endless belt chain conveyor, designated generally at 79 and comprising endless side chains 80, 80 connected together by spaced cross bars 81, in the same manner as the cross bars 61 connect the chains 60, 60 of the main conveyor 59. The belt conveyor 79 is inclined downwardly and forwardly from the rear end of the sub-frame 76 and is driven in the same direction as the main belt conveyor 59 by a sprocket chain 81 engaging on a sprocket wheel 82 secured on the shaft 67 and a similar sprocket 83 secured on a transverse shaft 84 journaled on the rear portion of sub-frame 76. Transverse shaft 84 has mounted thereon the supporting sprockets 83 for the rear portion of the endless belt conveyor 79. The forward portion of the endless belt conveyor is supported on sprockets carried by a transverse shaft 85 journaled on the forward portion of subframe 76.

Mounted on the forward portion of sub-frame 76 is a hay cutter 86 of generally conventional construction, for example, of the type having a pair of cooperating sickle bars 86a and 86b, one of said sickle bars reciprocating relative to the other in a transverse direction with respect to the direction of movement of the machine, the reciprocating sickle bars being driven by a pitman arm 87 pivotally connected to a rotary drive member 88. Drive member 88 is gearingly connected by suitable gears and shafts, as shown in Figure 1, to a bevel gear 89 connected to the end of the shaft 67. Thus, the hay cutter 86 is actuated simultaneously with the belt conveyors, whereby the cut hay is moved onto the belt conveyor 79 on sub-frame 76 and is thence moved upwardly onto the belt conveyor 59 in the intake conduit 52. Belt conveyor 59 then moves the hay successively through the inverted V-shaped bends of the drying tunnel 55 and discharges the dried hay into the exit conduit 53 at which point the hay is moved over the toothed guide roller 75 into the intake conduit 76a of the hay baler.

Sub-frame 76 is supported on a pair of swivelly-connected, ground-engaging caster wheels 90 which swivel freely to follow turning movements of the machine. The sub-frame is supported by the rollers 90 at a desired adjusted position, whereby the hay cutter 86 is held at a predetermined distance above ground level, for best cutting efficiency. As shown, the supporting shanks 91 of the rollers 90 are engaged in vertical sleeves 92 rigidly secured to the sides of sub-frame 76 and are retained in adjusted positions in said sleeves by top and bottom fastening nuts 93 and 94, as is clearly shown in Figure 4. Mounted in the main housing 45 and extending through and supported by the side walls 44 of said main housing are a plurality of transversely extending conduits 95 located beneath the respective inverted V-shaped bends of the drying tunnel 55 and provided at their ends with respective fuel burners 96. Fuel is supplied through the conduits 95 to the respective fuel burners 96 through respective control valves 97 from a main liquid fuel reservoir 98 mounted in the upper forward portion of main housing 45, as shown in Figure 5. Each of the inverted V-shaped bends is provided with an exhaust flue 98 connected to the space beneath an inverted V-shaped bend through the side wall 44 of the housing, as shown in Figure 9. Each of said spaces is similarly provided with a temperature indicating instrument 99, such as a thermometer or the like, mounted in the wall 44 and beneath the connection of the associated exhaust flue 98 therewith, as shown in Figure 9.

Each of the inverted V-shaped bends of the tunnel 55 is provided in its top wall with a plurality of steam escape vents 100 to allow evaporated moisture to escape from the drying chamber as the hay passes therethrough. The top walls of the respective inverted V-shaped bends are further provided with hinged access doors 101 which are held closed by pivoted catch members 102, said catch members being pivotally mounted in the top wall 56 adjacent the margins of the doors 101, as shown in Figure 10, and being rotatable into overlying relationship with the margins of the doors to keep the doors closed, but being at times rotatable to positions wherein the doors may be opened to provide access to the tunnel 55. The top wall 46 of the main housing 45 comprises a plurality of hinged doors 104 which are located to overlie the portions of the inverted V-shaped bends of the drying tunnel 55 containing the hinged doors 101, as shown in Figure 5, whereby access to the hinged doors 101 may be obtained by opening the hinged top doors 104 upwardly adjacent thereto. Said hinged top doors 104 are provided with the transverse handles 105 allowing the doors 104 to be easily opened.

Designated at 106 is a tool compartment which is provided in the upper rear end of the main housing 45, said tool compartment 106 being provided with a hinged top cover 107 provided with a handle 108, whereby access to necessary tools may be obtained by raising the top cover 107.

In operation, as previously described, the hay is cut by the cutter 86 as the machine moves forwardly, the cut hay being transported over the preliminary belt conveyor 79 to the intake conduit 52 and onto the main belt conveyor 59. The hay is then moved successively through the inverted V-shaped bends of the drying tunnel 55, being heated by the burners 96 in the successive bends to drive moisture out of the cut hay. The dried hay then leaves the drying tunnel 55 through the discharge conduit 53 and is guided into the intake conduit 76a of the baler over the toothed roller 75, as previously described.

The speed of operation of the machine may be required by selecting the desired speed by means of the speed selecting lever 34 of the transmission unit 33. Thus, if the hay is very wet, the machine may be operated at a relatively slow speed, providing more drying time for each unit quantity of hay processed by the machine. Conversely, if the hay is relatively dry when cut, a high speed of operation may be selected for the machine, providing a relatively short drying time per unit quantity of harvested hay.

As shown in Figure 2, the steering knuckle 18 at the forward end of the frame 13 is connected to the hitch bar 27 of tractor 28 through a bell crank 109, pivoted to frame 13, and a connecting link bar 110, which connects the bell crank 109 to the hitch bar 27, whereby turning movements of the tractor are transmitted to the steering linkage of the hay harvesting machine, as illustrated in Figure 2, causing the wheels 14 and the wheels 15 to be steered in opposite directions, allowing the machine to be turned to follow the movement of the tractor 28. When tractor 28 turns in one direction, bell crank 109 is similarly rotated, and conversely when the tractor 28 turns in the opposite direction, bell crank 109 follows its rotation because of the connection of link bar 110 to hitch bar 27.

The sub-frame 76 is further provided with upstanding vertical side walls 11 which flare forwardly at their front ends, defining a guideway for guiding the cut hay upwardly on the belt conveyor 79 toward the intake conduit 52 of the drying tunnel 55.

While a specific embodiment of an improved hay drying machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A machine for harvesting and drying hay comprising a wheeled frame, means on said frame for connecting the latter to a towing vehicle, a closed upstanding housing on said frame, said housing having a front wall and a rear wall, a plurality of cooperating top and bottom walls of inverted V-shape arranged in tandem relation fixedly positioned within said housing between the front and rear walls thereof and together forming a continuous open ended drying tunnel of inverted V-shape bends, an inlet conduit projecting from the front wall of said housing and in communication with the adjacent open end of said tunnel, an outlet conduit projecting outwardly from the rear wall of said housing and in communication with the other open end of said tunnel, and conveying means confined within said inlet and outlet conduits and said tunnel and operatively mounted for progressively conveying incoming cut hay entering said inlet conduit through the latter named conduit, said tunnel, said outlet conduit, and out of the exit end of said outlet conduit, and heating means between each of the bends of said tunnel for drying the cut hay as it travels through said tunnel.

2. The machine according to claim 1 which includes in addition an inclined wheel sub-frame arranged forwardly of the inlet conduit and connected to said main frame for movement with the latter, a hay cutter on the lower end of said sub-frame, and conveying means on said sub-frame for conveying cut hay into the inlet conduit.

3. The machine according to claim 1 which includes in addition a rotatable toothed feed roller positioned in said outlet conduit adjacent the exit end for guiding the dried hay from said conveying means.

References Cited in the file of this patent

UNITED STATES PATENTS

| 1,500,862 | Bonaparte | July 8, 1924 |
| 2,756,554 | Diehl et al. | July 31, 1956 |

FOREIGN PATENTS

| 566,662 | Great Britain | Jan. 9, 1945 |
| 1,065,397 | France | Jan. 6, 1954 |